United States Patent [19]

Pong

[11] Patent Number: 5,413,207
[45] Date of Patent: May 9, 1995

[54] METHOD AND APPARATUS FOR DELIVERING ROLLED ROD TO A COOLING BED

[76] Inventor: David T. Pong, Shiu Wing Steel Limited, 1209 Jardine House, 1 Connaught Place, Hong Kong, Hong Kong

[21] Appl. No.: 73,736

[22] Filed: Jun. 8, 1993

[51] Int. Cl.⁶ ............................................. B65G 47/26
[52] U.S. Cl. .................................. 198/457; 198/690.1; 198/463.3
[58] Field of Search ............... 198/690.1, 457, 463.3

[56] References Cited

U.S. PATENT DOCUMENTS

| | | | |
|---|---|---|---|
| 1,126,978 | 2/1915 | George | 198/457 X |
| 1,929,487 | 10/1933 | Feller | 198/457 X |
| 1,937,991 | 12/1933 | Stearns | 198/690.1 |
| 2,416,690 | 3/1947 | Hardy | 198/690.1 X |
| 2,497,162 | 2/1950 | Findlay et al. | 198/690.1 |
| 2,726,754 | 12/1955 | Rodder | 198/457 |
| 3,483,959 | 12/1969 | Reiley | 198/690.1 |
| 3,610,402 | 10/1971 | Nord et al. | 198/690.1 |
| 3,687,258 | 8/1972 | Wolzak | 198/690.1 X |
| 4,208,164 | 6/1980 | White | 198/690.1 X |
| 4,593,807 | 6/1986 | Cattaneo et al. | 198/457 |

*Primary Examiner*—D. Glenn Dayoan
*Attorney, Agent, or Firm*—Ladas & Parry

[57] ABSTRACT

A method and apparatus for transferring rod sections from a flying shears to a cooling bed via a run-in table wherein electromagnetic coils are placed in hollow rollers at a downstream end of the run-in table to pull the leading ends of the rods onto the rollers and prevent bouncing of the rods whereafter braking force is applied to the trailing end of the rods before the rods are lifted by a lifting apron for transfer to the cooling bed. The rollers containing the electromagnetic coils are hollow and detachable to gain access to the interior of the rollers and the electromagnetic coils therein.

11 Claims, 2 Drawing Sheets

METHOD AND APPARATUS FOR DELIVERING ROLLED ROD TO A COOLING BED

FIELD OF THE INVENTION

The invention relates to a method and apparatus for delivering longitudinally advancing straight lengths of rolled rod to a cooling bed and particularly to a method and apparatus which avoids the production of cobbles in the rolled rod.

The invention relates particularly to such method and apparatus for handling longitudinally advancing straight lengths of rolled rod produced in a rolling mill at high speed.

BACKGROUND AND PRIOR ART

In the past decade many developments have been made in the high speed finishing of wire rod production. Among these are the introduction of the no twist rod block and the development of "laying reel" coil forming heads. The combination of both of these techniques have increased the finishing speeds of rod rolling from 50 M/s to Over 100 M/s. Relatively little development has been made on the rolling of straight bars. This is because there is not much problem with the rolling of larger bars, for example, up to 12 mm diameter. However, for diameters of 10 mm down to 8 mm, the rolling mill has to operate at lower speeds and hence at reduced capacity. In my earlier patent 5,027,632, there is disclosed a method and apparatus for rolling a bar and feeding the rolled bar to a splitter without twisting the bar (the so-called NTA system). The NTA system substantially increases the finishing speeds, but other problems still exist when a smaller diameter bar is fed to the cooling bed at a high speed.

Essentially, a run-in table receives the bars at high speed and the run-in table should theoretically be as smooth as possible to avoid contact of the front end of the bar with any protruding parts causing a cobble. Unfortunately, there are other functions that the run-in table has to perform and a smooth uninterrupted surface is not possible. Systems requiring limitation on the maximum length of the installation of a closed channel system pose additional maintenance difficulties.

A steel bar entering the run-in table of the cooling bed at a high speed would require a very long distance for the bar to slow down before it can be discharged onto the cooling bed for cooling purposes. Such long distances require much space and unnecessary expense in the construction of a building to accommodate the extra space. The braking distance is proportional to the square of the finishing speed in the case of natural braking. In order to reduce this braking distance, external brakes are employed.

Two known methods for braking the bars are as follows:

1) Braking by pinch rollers, (FIG. 1) whereby the steel bar 1 is passed through a pair of pinch rollers 2. The pinch rollers 2 serve two purposes, first, the pinch rollers accelerate the bar that has been cut to cooling bed length by flying shears 3 to separate it from the incoming bar and second the pinch rollers 2 are driven in reverse direction to brake the steel bar 1 to a manageable speed before discharge onto rakes of the cooling bed. This method has the disadvantage that it may cause damage to the surface of the steel bar. With this system, it is not required to install additional rollers along the run-in table of the cooling bed.

2) Braking by magnetic pads (FIG. 2) wherein magnetic pads 4 are installed under the lifting aprons of the run-in table. Upon energizing of the magnetic pads 4, the friction between the steel bar and the lifting table surface is increased thereby slowing the bar down. With this arrangement, additional rollers 5 are required along the lifting apron in order to accelerate the cut portion of the steel bar to separate the incoming bars after the flying shears 3. The top surfaces of rollers 5 must protrude above the level of the lifting apron in order to have contact with the steel bars. This can cause a "bouncing effect" on the front end of the steel bars, when the front end of the bar hits the top surface of the rollers. This may be a potential hazard for producing cobbles in the cooling bed.

SUMMARY OF THE INVENTION

An object of the invention is to provide a method and apparatus which minimizes the "bouncing effect" on the bars.

A further object of the invention is to achieve the above without the use of pinch rollers.

The above and further objects of the invention are satisfied by a construction in which a first magnetic means is operatively associated with the lifting apron for applying braking force to a tail end of the rolled rod to reduce the speed of advance of the rolled rod and a second magnetic means is operatively associated with the run-in table in spaced downstream location from the first magnetic means for applying a pulling force to a leading end of the rolled rod to maintain the leading end of the rod in contact with the run-in table as the rod is advanced thereon.

In accordance with the invention, a plurality of longitudinally spaced rollers extend transversely of the run-in table and the lifting apron in an arrangement in which the rolled rod advanced to the run-in table rides on said rollers and said rod is transferred on said rollers to said lifting apron, said second magnetic means being disposed in at least some of said rollers.

In further accordance with the invention, a control means is operatively connected to the first and second magnetic means for activating the first magnetic means when braking action is to be applied to the advancing rolled rod and for activating the second magnetic means when the rolled rod is on the run-in table.

Each roller with the included second magnetic means therein comprises a hollow roller member, a hollow rotatable outer shaft supporting the hollow roller member for rotation therewith, a fixed inner shaft rotatably supported within the rotatable outer shaft and an electromagnetic coil fixed to said inner shaft and disposed in said hollow roller member. According to a feature of the invention, the inner shaft is hollow and the second magnetic means further comprises electrical leads in the inner shaft connected to the electromagnetic coil. Additionally, the hollow inner shaft may include means for conveying a cooling fluid to the electromagnetic coil. Furthermore, the hollow roller member may include a detachable portion for exposing the electromagnetic coil.

DETAILED DESCRIPTION OF A PREFERRED EMBODIMENT

Figure 1:
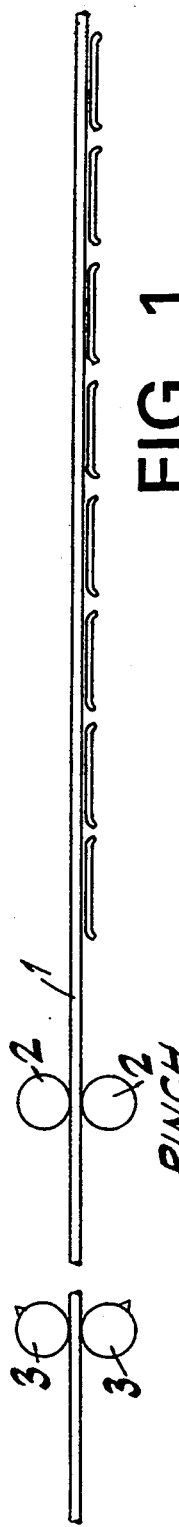
FIG. 1 is a diagrammatic longitudinal view of a conventional arrangement of a run-in table.
Figure 2:
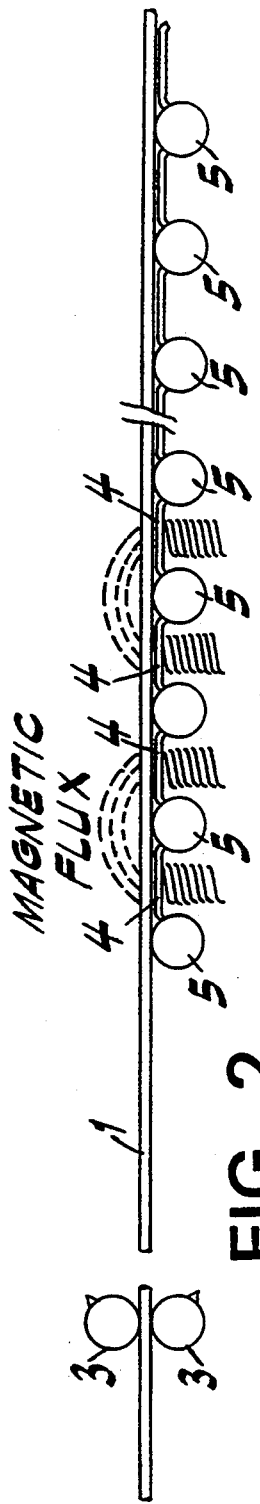
FIG. 2 is a diagrammatic longitudinal view of another conventional arrangement of a run-in table.
Figure 3:
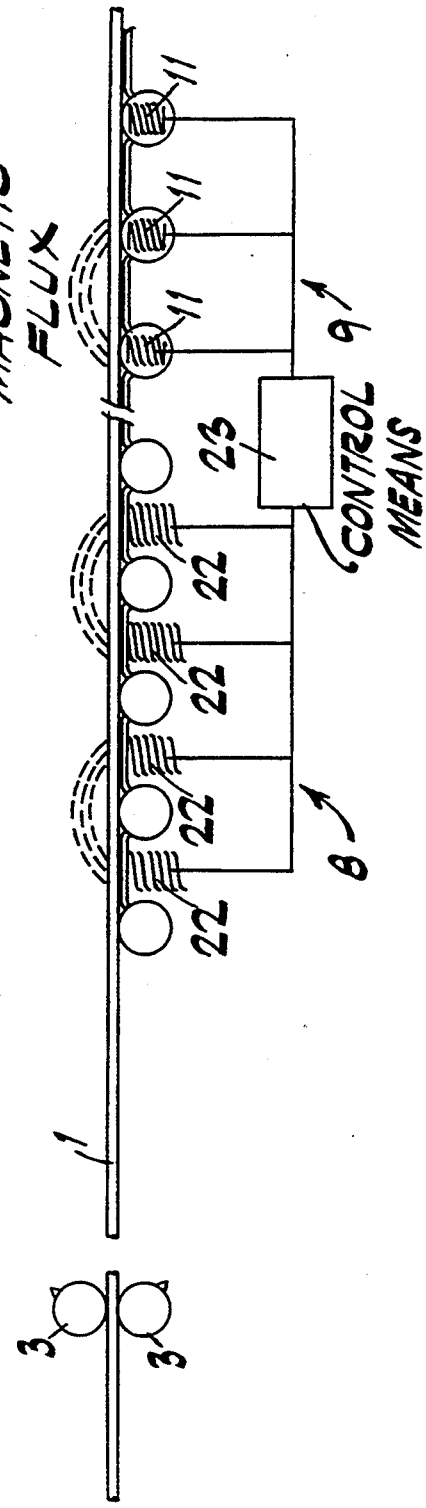
FIG. 3 is a diagrammatic longitudinal view of a run-in table, including one embodiment of the present invention.
Figure 4:
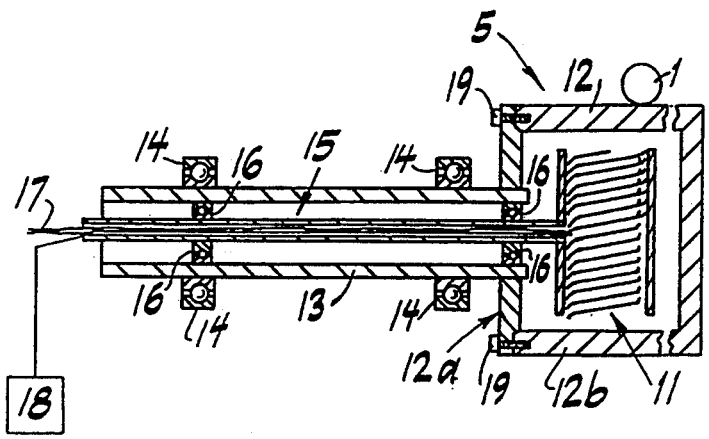
FIG. 4 is an enlarged sectional view of a detail of a roller of the run-in table in FIG. 3.
Figure 5:
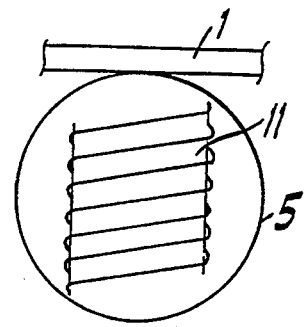
FIG. 5 is an end view of the roller of FIG. 4.

Referring to FIG. 3, a continuous length of steel rod is fed to flying shears 3 at relatively high speed from a rolling apparatus incorporating, for example, the NTA method as disclosed in my earlier patent 5,027,632. The flying shears 3 cut the continuous length of rod into sections 1 which are fed to a run-in table 6 shown in FIG. 6. The run-in table is of double lift apron type and it operates to deliver rod sections 1 to the rakes of a cooling bed 60.

The run-in table 6 comprises a plurality of longitudinally spaced rollers 5 rotatably supported by a fixed frame 7 at an inlet end 8 of the run-in table and at a downstream end 9 thereof. The rod sections 1 coming from the flying shears 3 enter the run-in table by riding on the surfaces of the rollers 5. Between the rollers 5 are arms 10 integral with frame 7. The upper surfaces of the rollers 5 are disposed slightly higher than arms 10 to insure that the rod sections 1 ride on the rollers 5. A lifting apron 20 is laterally adjacent to the arms 10 of the run-in table 6. The lifting apron 20 includes a plurality of fingers 21 which can be displaced vertically by a suitable drive mechanism (not shown) between a lowered position shown in dotted outline in FIG. 6 and a raised position shown in solid lines in FIG. 6. In the lowered position, the upper surface of the fingers 21 are aligned with the upper surface of the arms 10. The surfaces of the arms 10, the fingers 21 and the rollers 5 are inclined laterally downwards so that rod sections 1 can roll laterally downwards by gravity on the rollers 5 as will be explained later. Electromagnetic coils 22 are disposed beneath fingers 21 and form the electromagnetic pads 4.

Disposed at the downstream end 9 of the run-in table 6 are the rollers 5, arms 10 and fingers 21 of the lifting apron. No electromagnetic coils 22 are provided at the downstream end. Between the upstream and downstream ends of the table 6 is an intermediate section where rollers 5 are present. The length of the run-in table and the number of rollers 5 is generally a function of the size of the rod sections and their speed of travel as is well known in the art.

The rollers 5 at the downstream end 9 of the run-in table 6 include electromagnetic coils 11 therein. The rollers 5 comprise hollow cylindrical bodies 12 fixed to a hollow rotatable shaft 13 mounted in bearings 14. A smaller hollow shaft 15 is concentrically mounted in shaft 13 through the intermediary of bearings 16 between shafts 13 and 15. The inner shaft 15 and coil 11 are stationary. Electrical cables 17 pass through the interior of shaft 15 and are connected to coil 11. A source of cooling liquid 18 is also connected to the interior of shaft 15 to cool the electromagnetic 11. In order to furnish access to the interior of the electromagnetic coil 11 and its related components, the cylindrical body 12 of the roller 5 includes a flange 12a fixed to shaft 13 and a detachable cylindrical portion 12b connected to flange 12a by bolts 19.

The electromagnetic coils 11 and 22 and the lifting apron 20 are connected to a control means 23 in the form of a CPU for activating and deactivating the coils 11 and 22 and raising and lowering the lifting apron 20 in sequence to carry out the following operation.

Figure 6:
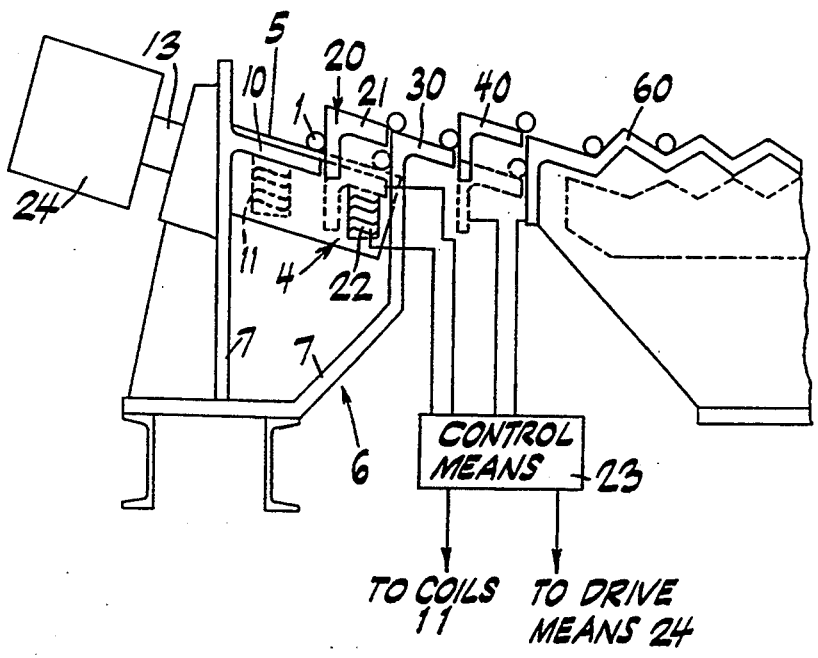
FIG. 6 is a diagrammatic transverse view of the run-in table of FIG. 3 with a lifting apron and cooling bed.

The continuous rod is supplied at relatively high speed to the flying shears 3. The apron 20 is in its raised position as shown in FIG. 6 and the rod rides on the surfaces of rollers 5 at the inlet end 8 of the run-in table. The raised apron 20 keeps the rod in alignment in the rolls of the flying shears approximately at the middle of the rollers 5. When the leading or head end of rod 1 reaches the rollers 5 at the downstream end 9 of the run-in table, the electromagnetic coils 11 are activated to apply a pulling force on the rod to keep the head end of the rod on the rollers 5 and prevent bouncing of the head end of the rod on the rollers 5. The flying shears 3 then cut the rod to separate rod section 1 from the rest of the rod stock. The rollers 5 are then driven in rotation by a drive means 24 to accelerate the separated rod section 1 to space the cut end of the rod section from the adjacent end of the rod stock. The lifting apron 20 is then lowered, electromagnetic coils 11 are deenergized, the drive of rollers 5 is halted and the rod section 1 rolls downwardly by gravity on rollers 5 until the rod section contacts a fixed flange 30 extending lengthwise along the frame 7 of the run-in table. Then the electromagnetic coils 22 of the electromagnetic pads are energized to apply braking force to the tail end of the rod section 1. When the rod section has slowed sufficiently, the lifting apron 21 is raised to its initial position and the rod section 1 is transferred onto the top of flange 30 where the rod rolls laterally downwards thereon to a second lifting apron 40 which is in a raised position to retain the rod section 1 on flange 30. Lifting apron 40 is subsequently lowered and the rod section 1 rolls laterally downwards thereon to abut against the rakes of the cooling bed 60. When the lifting apron 40 is subsequently raised, the rod section 1 is transferred to the top of the rakes of the cooling bed 60 and the rod is advanced stepwise on the rakes of the bed while undergoing cooling.

When the lifting apron 20 has been raised to its initial position and the rod section 1 has been transferred to the top of flange 30, the run-in table is in its initial state to receive the leading end of the rod stock to repeat the operation.

The run-in table has been disclosed with reference to a two stage lifting apron which assists in slowing down the advancing rod section before it is transferred to the cooling bed. The invention, however, is equally applicable to a one stage lifting apron.

In the sequence of the operation, the control means 23 activates the electromagnetic coils 11 when the leading and of the rod section 1 enters the downstream section 9 to apply the pulling force on the free leading end of the rod section. The coils 11 are deactivated when lifting apron 21 is lowered so as not to impede the downward rolling travel of the rod section 1 on the arms 21 of the lifting apron 20. When the electromagnetic coils 22 are activated to apply braking force to the trailing end of the rod section, the leading end of the rod section will have been stabilized against bouncing. When the lifting apron 20 is ready to be raised again, the coils 22 are deenergized so as not to impede the lifting of the rod section 1 from the rollers 5.

By virtue of the action of both the electromagnetic coils 11 and 22 in the described sequence, not only will there be maximized braking, but there will be little damage on the surface of the steel rods as would be caused by pinch rollers and concurrently the "bouncing effect" of the rods is eliminated whereby the run-in table is able to accept a much higher finishing speed of the rod resulting in higher productivity along with reliability of operation.

The rollers 5 at the downstream section 9 are present in a number which is a function of the length of the cooling bed, the spacing of the rollers being about 1.5 meters, The downward pulling force exerted by the electromagnetic coils 11 in rollers 5 is relatively low and is intended to stabilize the front end of the rod section 1 without applying too great a force which would lift the trailing end of the rod section off the rollers 5. The braking force exerted by the electromagnetic coils 11 is much greater as the leading end of the advancing rod section tends to move downwards against the rollers when the braking force is applied. Hence, the rod remains stable on the rollers 5 without bouncing.

Although the invention has been described in relation to a specific embodiment thereof, it will become apparent to those skilled in the art that numerous modifications and variations can be made within the scope and spirit of the invention as defined in the attached claims.

What is claimed is:

1. In rolling mill apparatus for high speed production of rolled rod in which rolled rod is longitudinally advanced to an entry end of a run-in table and after supply of the rolled rod onto the run-in table, a lifting apron laterally displaces the rod from the run-in table towards a cooling bed, said apparatus comprising first magnetic means operatively associated with the lifting apron for applying braking force to a tail end of the rolled rod to reduce speed of advance of the rolled rod and second magnetic means operatively associated with the run-in table in spaced downstream location from the first magnetic means for applying a pulling force to a leading end of the rolled rod to maintain the leading end of the rod in contact with the run-in table as the rod is advanced thereon.

2. Apparatus as claimed in claim 1, comprising a plurality of longitudinally spaced rollers extending transversely of the run-in table and the lifting apron in an arrangement in which the rolled rod advanced to the run-in table rides on said rollers and said rod is transferred on said rollers to said lifting apron for lateral displacement from the run-in table, said second magnetic means being disposed in at least some of said rollers.

3. Apparatus as claimed in claim 2, wherein said first magnetic means comprises magnetic pads disposed under the lifting apron between successive rollers in the region of the entry end of the run-in table.

4. Apparatus as claimed in claim 3, comprising control means for activating said first magnetic means when braking action is to be applied to the advancing rolled rod.

5. Apparatus as claimed in claim 4, wherein said second magnetic means is connected to said control means to be activated when the rolled rod is on the run-in table.

6. Apparatus as claimed in claim 2, wherein each said roller in which said second magnetic means is disposed, comprises a hollow roller member, a hollow rotatable outer shaft supporting said hollow roller member for rotation therewith, a fixed inner shaft rotatably supported within the rotatable outer shaft and an electromagnetic coil fixed to said inner shaft and disposed in said hollow roller member.

7. Apparatus as claimed in claim 6, wherein said inner shaft is hollow, said second magnetic means further comprising electrical leads in said inner shaft connected to said electromagnetic coil.

8. Apparatus as claimed in claim 7, wherein said hollow inner shaft comprises means for conveying a cooling fluid to said electromagnetic coil.

9. Apparatus as claimed in claim 6, wherein said hollow roller member includes a detachable portion for exposing said electromagnetic coil in the hollow roller member.

10. Apparatus as claimed in claim 5, wherein said rollers are downwardly inclined from the run-in table to the lifting apron, said lifting apron comprising fingers between the rollers which are vertically displaceable between a lowered position in which the rolled rod travels downwardly on the rollers from the run-in table to the lifting apron, and a raised position in which the rolled rod on the lifting apron is lifted from the rollers thereon for delivery towards the cooling bed.

11. Apparatus as claimed in claim 10, wherein said control means deactivates said first and second magnetic means when the lifting apron is moved from the lowered position to the raised position.

* * * * *